US012687398B2

(12) United States Patent
Xu et al.

(10) Patent No.: US 12,687,398 B2
(45) Date of Patent: Jul. 21, 2026

(54) SYSTEMS AND METHODS FOR CUSTOMIZED NAVIGATION

(71) Applicant: Walmart Apollo, LLC, Bentonville, AR (US)

(72) Inventors: Huozhou Xu, Rogers, AR (US); William R. Rose, Noel, MO (US); Jie Zhu, Fayetteville, AR (US); Bowen Gong, Centerton, AR (US); Yanbin Ye, Bentonville, AR (US); Jiankun Liu, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 7 days.

(21) Appl. No.: 18/227,197

(22) Filed: Jul. 27, 2023

(65) Prior Publication Data

US 2023/0366681 A1 Nov. 16, 2023

Related U.S. Application Data

(63) Continuation of application No. 16/657,790, filed on Oct. 18, 2019, now abandoned.

(60) Provisional application No. 62/750,783, filed on Oct. 25, 2018.

(51) Int. Cl.
| | |
|---|---|
| *G01C 21/20* | (2006.01) |
| *G06K 7/10* | (2006.01) |
| *G06Q 10/087* | (2023.01) |
| *G06Q 30/0601* | (2023.01) |
| *G09F 3/20* | (2006.01) |
| *H04W 4/021* | (2018.01) |
| *H04W 4/33* | (2018.01) |

(52) U.S. Cl.
CPC ....... *G01C 21/206* (2013.01); *G06K 7/10099* (2013.01); *G06Q 10/087* (2013.01); *G06Q 30/0643* (2013.01); *G09F 3/208* (2013.01); *H04W 4/021* (2013.01); *H04W 4/33* (2018.02)

(58) Field of Classification Search
CPC ........ G01C 21/206; G09F 3/208; H04W 4/02; H04W 4/021; H04W 4/024; H04W 4/33; G06Q 10/087
USPC ........................................ 701/409
See application file for complete search history.

(56) References Cited

U.S. PATENT DOCUMENTS

| | | | |
|---|---|---|---|
| 6,386,450 B1 | 5/2002 | Ogasawara | |
| 6,497,367 B2 | 12/2002 | Conzola et al. | |
| 6,587,835 B1 | 7/2003 | Treyz et al. | |

(Continued)

*Primary Examiner* — Luna Champagne
(74) *Attorney, Agent, or Firm* — Foley IP Law, PLLC

(57) ABSTRACT

In some embodiments, apparatuses and methods are provided herein useful to providing customized in-store navigation. In some embodiments, there is provided a system for providing customized in-store navigation including shelving units; shelf electronic shelf labels; product electronic shelf labels; a navigation services control circuit configured to transmit location information associated with the product ESLs at a retail store to an in-store navigation interface operable on a portable electronic device when the portable electronic device is inside the retail store; and the in-store navigation interface configured to: identify a target retail product; receive location information; determine a location of the target retail product; and display directions to the location of the target retail product on a display device.

20 Claims, 15 Drawing Sheets

(56)             References Cited

U.S. PATENT DOCUMENTS

| | | | |
|---|---|---|---|
| 6,601,764 B1* | 8/2003 | Goodwin, III ....... | G06Q 10/087 |
| | | | 235/385 |
| 7,063,263 B2 | 6/2006 | Swartz et al. | |
| 8,060,412 B2 | 11/2011 | Rosenbaum et al. | |
| 8,412,590 B2 | 4/2013 | Elliott | |
| 8,538,442 B1* | 9/2013 | Ettinger ............. | H04W 40/244 |
| | | | 455/446 |
| 9,147,212 B2 | 9/2015 | Pettyjohn et al. | |
| 9,171,448 B1* | 10/2015 | Foster ................... | G01S 13/878 |
| 10,357,118 B2 | 7/2019 | Swafford | |
| 2002/0128765 A1* | 9/2002 | Cato .................. | G06Q 30/0641 |
| | | | 340/988 |
| 2002/0138372 A1* | 9/2002 | Ludtke .................. | G06Q 30/02 |
| | | | 235/385 |
| 2005/0137943 A1* | 6/2005 | Holzman ............. | G06Q 10/087 |
| | | | 705/28 |
| 2005/0281320 A1* | 12/2005 | Neugebauer .......... | H04B 1/707 |
| | | | 375/141 |
| 2008/0301102 A1 | 12/2008 | Liang | |
| 2009/0012704 A1 | 1/2009 | Franco et al. | |
| 2016/0055562 A1* | 2/2016 | Kim ........................ | H04W 4/80 |
| | | | 705/26.61 |
| 2017/0076361 A1* | 3/2017 | Levesque ........... | G06Q 30/0633 |
| 2017/0213057 A1 | 7/2017 | Primm et al. | |
| 2018/0260885 A1 | 9/2018 | Binafard et al. | |
| 2019/0188631 A1 | 6/2019 | Mohiuddin et al. | |

* cited by examiner

700

308

502

204

SYSTEMS AND METHODS FOR CUSTOMIZED NAVIGATION

CROSS-REFERENCE TO RELATED APPLICATION(S)

This application is a continuation of U.S. application Ser. No. 16/657,790 filed Oct. 18, 2019, which claims the benefit of U.S. Provisional Application No. 62/750,783 filed Oct. 25, 2018, all of which are incorporated herein by reference in their entirety.

TECHNICAL FIELD

This invention relates generally to providing navigation and/or direction in a facility.

BACKGROUND

Retail stores are generally used for day-to-day shopping purposes. However, searching for a particular item in a large retail environment can sometimes become a challenging task.

BRIEF DESCRIPTION OF THE DRAWINGS

Disclosed herein are embodiments of systems, apparatuses and methods pertaining to providing customized in-store navigation. This description includes drawings, wherein.

Figure 1:
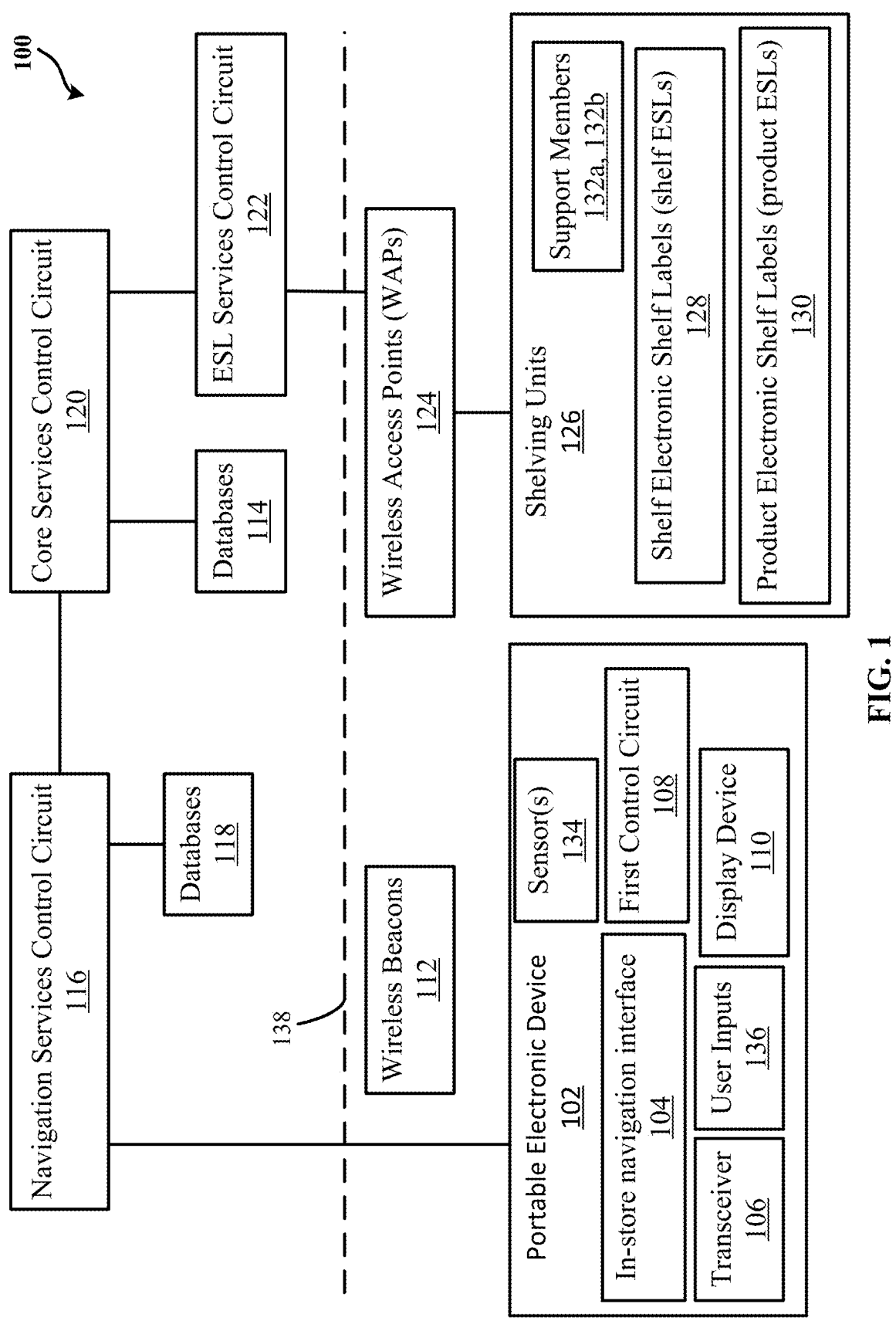
FIG. 1 is an exemplary block diagram of a system providing customized in-store navigation in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for providing customized in-store navigation to a user inside a retail store. In some embodiments, there is provided a system including a plurality of shelving units in a retail store configured to store a plurality of retail products. By one approach, each of the plurality of shelving units includes a plurality of shelves each distributed along a height of and in between at least two support members coupled to each end of the plurality of shelves. In one configuration, the system may include a plurality of shelf electronic shelf labels (shelf ESLs). By one approach, each shelf ESL of the plurality of shelf ESLs may be mounted to a portion of the shelving unit of the plurality of shelving units. In another configuration, the system may include a plurality of product electronic shelf labels (product ESLs) communicatively coupled to at least one of the plurality of shelf ESLs. By one approach, at least one of the plurality of product ESLs may be associated with at least one of the plurality of shelves of the shelving unit. By another approach, each product ESL may be associated with a set of product items belonging to a particular retail product of the plurality of retail products. In another configuration, the system may include a plurality of wireless access points (WAPs) configured to wireless communicate with the at least one of the plurality of shelf ESLs and the plurality of product ESLs. For example, the plurality of WAPs may be coupled to an ESL services control circuit. In another configuration, the system may include one or more databases that may store a plurality of location information associated with the plurality of product ESLs at the retail store relative to a layout of a map of the retail store.

In another configuration, the system may include a navigation services control circuit coupled to the WAPs and the one or more databases. By one approach, the navigation services control circuit is implemented at a server remote from the store location. By one approach, the navigation services control circuit may transmit the plurality of location information associated with the plurality of product ESLs at the retail store to an in-store navigation interface operable on a portable electronic device when the portable electronic device is inside the retail store. In another configuration, the system may include a plurality of wireless beacons located proximate to the plurality of shelving units. By one approach, the plurality of wireless beacons may transmit wireless beacon signals. In another configuration, the system may include the in-store navigation interface. By one approach, the in-store navigation interface may receive an input from a user associated with the portable electronic device. Alternatively or in addition to, the in-store navigation interface may identify a target retail product of the plurality of retail products from the input. Alternatively or in addition to, the in-store navigation interface may receive the plurality of location information associated with the plurality of product ESLs via a transceiver of the portable electronic device. Alternatively or in addition to, the in-store navigation interface may receive beacon signals transmitted by the plurality of wireless beacons. Alternatively or in addition to, the in-store navigation interface may determine, in cooperation with a first control circuit of the portable electronic device and based on the beacon signals, a location of the portable electronic device. Alternatively or in addition to, the in-store navigation interface may determine a location of the target retail product identified from the voice input based on the plurality of location information associated with the plurality of product ESLs. Alternatively or in addition to, the in-store navigation interface may display directions to the location of the target retail product on a display device of the portable electronic device, wherein the directions to the location of the target retail product are overlaid on the layout of the map of the retail store.

In some embodiments, there is a method for providing customized in-store navigation to a user inside a retail store including receiving, by an in-store navigation interface operable on a portable electronic device when the portable electronic device is inside a retail store, an input from a user associated with the portable electronic device. By one approach, the method may include identifying, by the in-store navigation interface, a target retail product of a plurality of retail products from the input. By another approach, the method may include receiving, by the in-store navigation interface from a navigation services control circuit, a plurality of location information associated with a plurality of product ESLs via a transceiver of the portable electronic device. In one configuration, at least one of the plurality of product ESLs may be associated with at least one of a plurality of shelves of a shelving unit of a plurality of shelving units in the retail store. In another configuration, each product ESLs of the plurality of product ESLs may be associated with a set of product items belonging to a particular retail product of the plurality of retail products. In another configuration, each of the plurality of shelving units may include a plurality of shelves each distributed along a height of and in between at least two support members coupled to each end of the plurality of shelves. By another approach, the method may include receiving, by the in-store navigation interface, beacon signals transmitted by a plurality of wireless beacons in the retail store. By another approach, the method may include determining, by the in-store navigation interface in cooperation with a first control circuit of the portable electronic device and based on the beacon signals, a location of the portable electronic device. By another approach, the method may include determining, by the in-store navigation interface, a location of the target retail product identified from the input based on the plurality of location information associated with the plurality of product ESLs. In one configuration, the plurality of location information associated with the plurality of product ESLs may be transmitted by a plurality of shelf electronic shelf labels (shelf ESLs) to a plurality of wireless access points (WAPs). Alternatively or in addition to, the method may include displaying, by the in-store navigation interface, a direction to the location of the target retail product to a display device of the portable electronic device. In one scenario, the direction to the location of the target retail product may be overlaid on a layout of a map of the retail store. In another scenario, the plurality of location information associated with the plurality of product ESLs at the retail store relative to the layout of the map may be stored by one or more databases coupled to the navigation services control circuit.

To illustrate, FIGS. 1-11 are described below. FIG. 1 is an exemplary block diagram of a system 100 providing customized in-store navigation in accordance with some embodiments. FIG. 1 is explained with FIG. 2, which is a schematic illustration of shelving units of a system for providing customized in-store navigation in accordance with some embodiments. The system 100 includes a plurality of shelving units 126 in a retail store. The shelving units 126 may store a plurality of retail products 204. By one approach, each of the plurality of shelving units 126 may include a plurality of shelves 206 each distributed along a height of and in between at least two support members 132a, 132b coupled to each end of the plurality of shelves 206. In some configuration, the system 100 may include a plurality of shelf electronic shelf labels (shelf ESLs) 128. By one approach, each shelf ESL of the plurality of shelf ESLs 128 may mounted to a portion of a shelving unit 202 of the plurality of shelving units 126. In one example, the shelf ESL 128 may be mounted at a top of one or both of the two support members 132a, 132b. In one scenario, each of the shelf ESLs 128 may be mounted to each one of the at least two support members 132a, 132b. In another example, the shelf ESL 128 may be mounted somewhere along the height of at least one of the two support members 132a, 132b. In another example, the shelf ESL 128 may be associated with a particular shelving unit 202. For example, each of the shelf ESLs 128 may be associated with a particular shelving unit of the plurality of shelving units 126. In some embodiments, a shelf ESL 128 may be associated with a particular shelf and/or area inside a retail store. For example, the shelf ESL 128 may send wireless signals to one or more WAPs 124 that are proximate to the shelf ESL 128. In response, the signal strength between each of the WAPs 124 and the shelf ESL 128 may be determined by the ESL services control circuit 122, the WAPs 124, other control circuit not shown, and/or one or more control circuits shown in FIG. 1. Based on the determined signal strength between each of the WAPs 124 and the shelf ESL 128, the ESL services control circuit 122, the WAPs 124, the other control circuit not shown, and/or the one or more control circuits shown in FIG. 1 may triangulate the location of the shelf ESL 128. In another example, a second portable electronic device (not shown) associated with the retail store may be placed proximate the shelf ESL 128 while the second portable electronic device sends communication signals with the WAPs 124. As such, the signal strength (e.g., received signal strength indication (RSSI) measurements) between each of the WAPs 124 and the second portable electronic device may be determined and, based on the determination, the location of the second portable electronic device is triangulated by the ESL services control circuit 122, the WAPs 124, other control circuit not shown, and/or one or more control circuits shown in FIG. 1. Such triangulation techniques based on signal strength are generally known in the relevant arts. In response, the ESL services control circuit 122, the WAPs 124, other control circuit not shown, and/or one or more control circuits shown in FIG. 1 may associate the triangulated location of the second portable electronic device as the location of the shelf ESL 128. By one approach, the WAPs 124 may include WIFI-based access points and BLUETOOTH-based access points, and/or other wireless communication protocols standard to the industry and/or one or more privately created wireless communication protocols used by companies in the industry. In some configuration, the triangulation may be performed using one or more of the commercially known/available signal processing techniques/methodology/algorithm. In one example, the plurality of shelf ESLs 128 may include commercially available electronic shelf labels, user-modified commercially available electronic shelf labels, and/or the like.

In some configuration, the system 100 may include a plurality of product electronic shelf labels (product ESLs) 130. By one approach, the product ESLs 130 may communicatively couple to at least one of the plurality of shelf ESLs 128. By another approach, at least one of the plurality of product ESLs 130 may be associated with at least one of the plurality of shelves 126 of the shelving unit 202. In one example, each product ESL being associated with a set of product items belonging to a particular retail product of the plurality of retail products 204 as illustratively shown in FIG. 2. For example, a particular set of product ESLs 130 may be associated with a particular shelf ESL 128. In one example, the particular shelf ESL 128 may receive signals emitted by each of the particular set of product ESLs 130. In one scenario, the particular shelf ESL 128 may determine that location of each of the particular set of product ESLs 130 and/or send the determined location to the WAPs 124. In another scenario, the particular shelf ESL 128 may determine the signal strength (e.g., RSSI measurements) of received signaling emitted by each of the particular set of product ESLs 130 and/or send the determined signal strengths to the WAPs 124. In yet another scenario, a product ESL 130 may send wireless signals to one or more WAPs 124 that are proximate to the product ESL 130. In response, the signal strength between each of the WAPs 124 and the product ESL 130 may be determined by the ESL services control circuit 122, the WAPs 124, other control circuit not shown, and/or one or more control circuits shown in FIG. 1. Based on the determined signal strength between each of the WAPs 124 and the product ESL 130, the ESL services control circuit 122, the WAPs 124, the other control circuit not shown, and/or the one or more control circuits shown in FIG. 1 may triangulate the location of the product ESL 130. By one approach, the WAPs 124 may include WIFI-based access points and BLUETOOTH-based access points, and/or other wireless communication protocols standard to the industry and/or one or more privately created wireless communication protocols used by companies in the industry.

In some configuration, the triangulation may be performed using one or more of the commercially known/available signal processing techniques/methodology/algorithm. In some configuration, the system 100 may include the plurality of wireless access points (WAPs) 124. By one approach, the WAPs 124 may wireless communicate with the at least one of the plurality of shelf ESLs 128 and the plurality of product ESLs 130. By another approach, the WAPs may couple to an ESL services control circuit 122. In some implementation, the ESL services control circuit 122 may receive the plurality of location information transmitted by the plurality of product ESLs 130. Alternatively or in addition to, the ESL services control circuit 122 may transmit particular pricing information to each of the plurality of product ESLs 130. By one approach, the ESL services control circuit 122 may transmit the particular pricing information to the shelf ESL 128 and the shelf ESL 128 sends corresponding pricing information to each of the product ESLs 130 associated with the shelf ESL 128. By another approach, the ESL services control circuit 122 may associate each of the shelf ESLs 128 and/or product ESLs 130 with areas/locations in the retail store. In such an approach, locations of each of the shelf ESLs 128 and/or product ESLs 130 relative to a layout map of the retail store may be stored by one or more databases associated with the ESL services control circuit 122. By yet another approach, the ESL services control circuit 122 may include one or more locally located and cloud-based control circuits. In one example, the plurality of product ESLs 130 may include commercially available electronic shelf labels, user-modified commercially available electronic shelf labels, and/or the like. By yet another approach, the ESL services control circuit 122 may include distributed computing computers, server, processors, and control circuits.

In some configurations, the system 100 may include one or more databases 118. By one approach, the one or more databases 118 may store a plurality of location information associated with the product ESLs 130 at the retail store relative to a layout of a map of the retail store. In one implementation, the one or more databases 118 may be distinct from the one or more databases 114 associated with the ESL services control circuit 122 as described above. In such an implementation, the one or more databases 118 may be associated with a navigation services control circuit 116. In yet another implementation, the ESL services control circuit 122 may send the plurality of location information associated with the product ESLs 130 to a core services control circuit 120 and the core services control circuit 120 may send the plurality of location information associated with the product ESLs 130 to the navigation services control circuit 116. In response, the navigation services control circuit 116 may initiate the one or more databases 118 to store the plurality of location information associated with the product ESLs 130. In some embodiment, one or more of the core services control circuit 120, the navigation services control circuit 116, and the ESL services control circuit 122 may be locally located at the retail store. In one example, databases described herein, for example, the one or more databases 118 and the plurality of databases 114 may include one or more semiconductor memories, random access memories (RAM), read only memories (ROM), hard disk drives (HDDs), solid-state drives (SSDs), network-attached storage (NAS) devices, storage area networks (SANs), and the like. In some implementation, the plurality of databases 114 may store one or more of a plurality of pricing data, a plurality of product items data, a plurality of product items sales descriptions, and a plurality of promotional data. By one approach, the core services control circuit 120 may access the plurality of databases 114 and associate and/or send one or more information stored in the plurality of databases 114 to one or more of the ESL services control circuit 122 and the navigation services control circuit 116. In some implementation, the core services control circuit 120 may receive the plurality of location information of the plurality of product ESLs 130 from the ESL services control circuit 122. Alternatively or in addition to, the core services control circuit 120 may transmit the plurality of location information of the plurality of product ESLs 130 to the navigation services control circuit 116. In some embodiments, the navigation services control circuit 116 may associate each of the plurality of location information of the plurality of product ESLs 130 with one or more floor areas in the retail store. Alternatively or in addition to, the navigation services control circuit 116 may transmit the map of the retail store to the in-store navigation interface 104.

In some configuration, the system 100 may include the navigation services control circuit 116. By one approach, the navigation services control circuit 116 may couple to the WAPs 124 and/or the one or more databases 118. In one example, the navigation services control circuit 116 may transmit the plurality of location information associated with the plurality of product ESLs 130 at the retail store to an in-store navigation interface 104 operable on a portable electronic device 102 when the portable electronic device 102 is inside the retail store. By one approach, the plurality of location information may be transmitted periodically. By another approach, the navigation services control circuit 116 may determine, based on the portable electronic device 102 communicative coupling with one or more WAPs 124, that the portable electronic device 102 is inside the retail store. In response, the navigation services control circuit 116 may transmit the plurality of location information to the portable electronic device 102. In some embodiments, the navigation services control circuit 116 may include one or more locally located and cloud-based control circuits. In another example, the navigation services control circuit 116 may include distributed computing computers, server, processors, and control circuits.

In some configuration, the system 100 may include a plurality of wireless beacons 112 located proximate to the plurality of shelving units 126. By one approach, the wireless beacons 112 may transmit wireless beacon signals. In some implementation, each wireless beacon signal of the plurality of wireless beacons 112 may include a beacon identifier. By one approach, the wireless beacon signals may be transmitted periodically by the wireless beacons 112. As such, as a user associated with the portable electronic device 102 walks/shops at the retail store, the portable electronic device 102 receives the wireless beacon signals. In some embodiments, the wireless beacons 112 may include WIFI-based beacons, BLUETOOTH-based beacons, and/or other wireless communication protocols standard to the industry and/or one or more privately created wireless communication protocols used by companies in the industry. In one implementation, the portable electronic device 102 and/or the in-store navigation interface 104 via a transceiver 106 of the portable electronic device 102 may receive the wireless beacon signals from the wireless beacons 112 that are proximate the portable electronic device 102. By one approach, the portable electronic device 102 and/or the in-store navigation interface 104 in cooperation with a first control circuit 108 of the portable electronic device 102 may determine the signal strength (e.g., take RSSI measurements) of each of the wireless beacon signals received. In response, based on the determined signal strength of the received wireless beacon signals from multiple wireless beacons, the portable electronic device 102 and/or the in-store navigation interface 104 in cooperation with the first control circuit 108 may determine the location of the portable electronic device 102 inside the retail store. For example, the portable electronic device 102 and/or the in-store navigation interface 104 may triangulate signal strength measurements of each of the wireless beacon signals and determine based on the triangulation the location of the portable electronic device 102. Indoor triangulation using WIFI and BLUETOOTH are generally known in the art. By one approach, the triangulation may be performed using one or more of the commercially known/available signal processing techniques/methodology/algorithm. It is noted that in the illustrated example of FIG. 1, the components illustrated below line 138 represent those components that are located within the retail store in use, and those components above line 138 are components external to or remote from the retail store. It is understood that other non-illustrated components exist to enable the various interconnections and communication between components. It is understood that in some embodiments, one or more components above line 138 could be at least partially implemented and located by components within the store, and vice versa.

Figure 3:
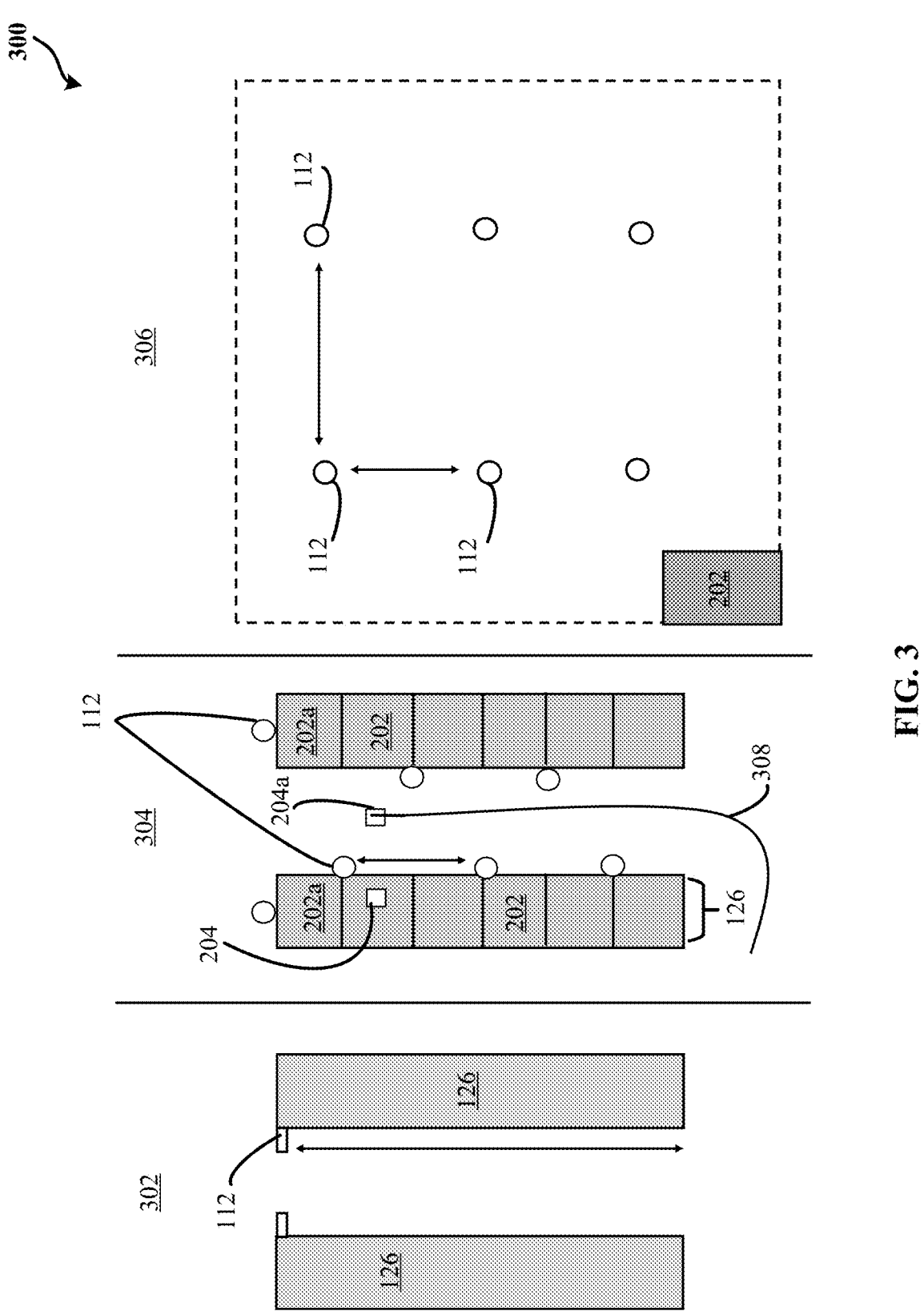
FIG. 3 is a schematic illustration of exemplary locations of wireless beacons of a system for providing customized in-store navigation in accordance with some embodiments.

FIG. 3 is shown to illustrate one or more placements of the plurality of wireless beacons in the retail store. FIG. 3 is a schematic illustration of exemplary locations 300 of wireless beacons of a system for providing customized in-store navigation in accordance with some embodiments. By one approach, the system may include the system 100 of FIG. 1. In some implementations, each wireless beacon of the plurality of wireless beacons 112 may be mounted proximate a top edge of the at least one of the at least two support members 132a, 132b of the shelving unit 202, as shown in 302 (aisle side view of the shelving units 126). In one example, the wireless beacon 112 may be mounted on one of the at least two support members 132a, 132b at a height within 5 feet to 14 feet relative to the floor of the retail store. In yet another example, the wireless beacon 112 may be mounted on one of the at least two support members 132a, 132b at 8 feet relative to the floor of the retail store. Alternatively or in addition to, each wireless beacon of the plurality of wireless beacons 112 associated with a first row of a pair of rows of a set of shelving units of the plurality of shelving units 126 may be a threshold distance apart from other wireless beacon of the plurality of wireless beacons 112, as shown in 304 (aisle top-down view of the shelving units 126). For example, the threshold distance may comprise a particular range. In one scenario, each of the wireless beacons 112 in the first row and/or the second row may be 12 feet to 15 feet apart from another wireless beacons 112. In another scenario, they may be 9 feet to 25 feet apart from one another. Alternatively or in addition to, each wireless beacon of the plurality of wireless beacons 112 associated with a second row of the pair of rows of the set of shelving units may be located diagonally relative to the plurality of wireless beacons 112 associated with the first row, as shown in 304. By one approach, each of the plurality of wireless beacons 112 associated the second row may be the threshold distance apart from other wireless beacon of the plurality of wireless beacons 112 associated with the second row, as shown in 304. In one example, the wireless beacons 112 may all be installed facing down throughout the retail store. In various embodiments, the location and spacing between wireless beacons ensures that a given portable electronic device 102 located in the space will be able to receive wireless beacon signals from at least 2 wireless beacons, preferably 3 or more to allow for adequate triangulation to determine the location of the portable electronic device 102 as it navigates the space relative to the shelves and products.

Alternatively or in addition to, a first beacon of the plurality of wireless beacons 112 associated with the first row may be mounted proximate a top-side edge of the at least one of the at least two support members 132*a*, 132*b* of an end shelving unit 202*a* of the plurality of shelving units 126 associated with the first row, as shown in 304. By one approach, the top-side edge may not be adjoining another top-side edge of a support member 132*a*, 132*b* associated with an adjoining shelving unit of the plurality of shelving units associated with the first row, as shown in 304. Alternatively or in addition to, a set of beacons of the plurality of beacons 112 may be mounted on a ceiling over one or more areas of the retail store, as shown in 306 (top-down view of an area of the retail store). As illustrated in 306 of FIG. 3, the plurality of shelving units 126 and/or the shelving unit 202 may be proximate to or not located in the one or more areas where the set of beacons of the plurality of beacons 112 are mounted on the ceiling. By one approach, each of the set of beacons may be a threshold apart that is within a particular range of distance. For example, each of the set of beacons may be separated from one another by a threshold that is within 12 feet to 20 feet. In such an example, the threshold may include the end ranges (e.g., 12 feet and 20 feet). In some embodiments, this spacing and arrangement serves to ensure adequate coverage of the area such that a given portable electronic device 102 will be able to receive multiple beacon signals for location determination. In some embodiments, the locations of the plurality of retail products 204 may be projected to the middle of the aisle (e.g., 204*a*) as shown in 304 of FIG. 3 to enable the navigation services control circuit 116 and/or the in-store navigation interface 104 provide more accurate directions 308. That is, from the navigation system standpoint, while the product is actually located on the shelf, the navigation system treats the product as if it were located in the middle of the aisle, or at another location close to the actual location of the product. For example, a user may follow the directions 308 to the target retail product (e.g., 204*a* in FIG. 3) and, when the user is at or proximate 204*a*, the user may be provided one or more directions 308 indicating to the user to turn left or right and/or indicate to the user that the target retail product is either to the user's left or right hand side.

In some configuration, the system 100 may include the in-store navigation interface 104. In one implementation, the in-store navigation interface 104 comprises a detachable circuitry enclosed in a housing. In one example, the in-store navigation interface 104 is detachably coupled to the portable electronic device 102. In another implementation, the portable electronic device 102 may comprise a computer program product embodied on a computer readable storage medium associated with the portable electronic device 102. In one example, the computer program product may include one or more computer codes for providing customized in-store navigation to a user inside a retail store. For example, the in-store navigation interface 104 may comprise a mobile app usable and/or downloadable to a mobile phone, such as an iPhone, an ANDROID phone, and/or the like, from an app store associated with APPLE, ANDROID, and/or other like companies/software the in-store navigation interface 104 vendors.

Figure 10:
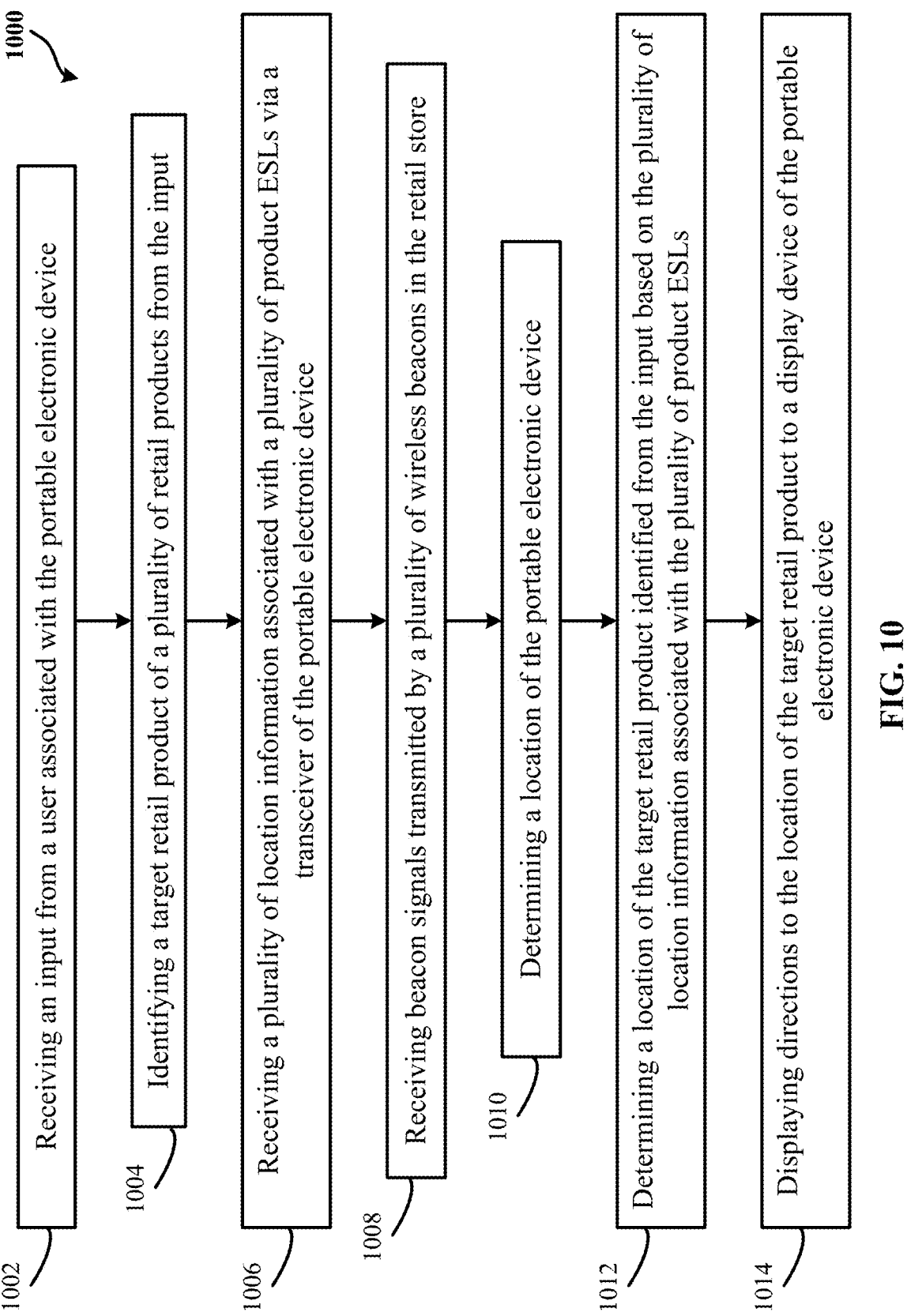
FIG. 10 is an exemplary flow diagram of a system for providing customized in-store navigation in accordance with some embodiments.

To help illustrate, FIG. 10 is an exemplary flow diagram (method 1000) of a system for providing customized in-store navigation in accordance with some embodiments. For example, the in-store navigation interface 104 may receive an input 136 from a user associated with the portable electronic device 102, at step 1002. In one scenario, the input 136 may comprise audio/voice, touch-based entry, keyboard-based entry, and other types of input to the portable electronic device 102. In an illustrative non-limiting example, a user having a portable electronic device 102 enters a retail store. By one approach, the user may operate on the portable electronic device 102 to communicate and/or couple with the WAPs 124 associated with the retail store. By another approach, the portable electronic device 102 may automatically communicate and/or couple with the WAPs 124 when the user enters the retail store. Alternatively or in addition to, the in-store navigation interface 104 may identify a target retail product of the plurality of retail products 204 from the input 136, at step 1004. For example, the user may utter a voice command such as "I want milk." In such an example, the in-store navigation interface 104 may identify that a target retail product may correspond to the item "milk. In another example, the in-store navigation interface 104 may automatically access an electronic shopping cart associated with the user's retail store account to identify one or more target retail products that the user may be interested in buying at the retail store. By one approach, the in-store navigation interface 104 may identify one or more target retail products from one or more inputs based on one or more commercially available and/or known speech processing techniques/algorithm/software. In one implementation, the in-store navigation interface 104 may receive the plurality of location information associated with the plurality of product ESLs 130 via a transceiver of the portable electronic device 102 when the navigation services control circuit 116 determines that the portable electronic device 102 is inside the retail store via the portable electronic device 102 communicating and/or coupling with at least one of the WAPs 124, at step 1006. Alternatively or in addition to, the navigation interface 104 may receive a layout of a map of the retail store. For example, the navigation services control circuit 116 may push (e.g., transmit) data onto the in-store navigation interface 104. By one approach, the data may comprise locations of the plurality of product ESLs 130 and each of the locations is associated with an area in the layout of the map of the retail store. In such an approach, the in-store navigation interface 104, after receiving the data pushed by the navigation services control circuit 116, may find a target retail product by comparing the target retail product with each of the retail products associated with each of the product ESLs 130 and determining the location of the product ESL 130 associated with the target retail product on the layout of the retail store.

By another approach, the data pushed by the navigation services control circuit 11 to the in-store navigation interface 104 may comprise locations of the plurality of product ESLs 130 and the layout of the map of the retail store. In such an approach, the in-store navigation interface 104, after receiving the data pushed by the navigation services control circuit 116, may overlay the locations of the plurality of product ESLs 130 on the layout of the map of the retail store such that when the data is pushed onto the in-store navigation interface 104, the in-store navigation interface 104 may determine a product ESL 130 and corresponding location that is associated with the target retail product based on the plurality of location information associated with the plurality of product ESLs 130. In response, the in-store navigation interface 104 may identify the corresponding location on the layout of the map of the retail store. As such, the in-store navigation interface 104 may determine a location of the target retail product identified from the voice input based on the plurality of location information associated with the plurality of product ESLs 130. Alternatively or in addition to, the in-store navigation interface 104 may receive beacon signals transmitted by the plurality of wireless beacons 112, at step 1008. Alternatively or in addition to, the in-store navigation interface 104 may determine, in cooperation with the first control circuit 108 of the portable electronic device 102 and based on the beacon signals, a location of the portable electronic device 102, at step 1010, as previously described above.

In some embodiments, the in-store navigation interface 104 may display directions to the location of the target retail product on a display device 110 of the portable electronic device 102. By one approach, the directions to the location of the target retail product may be overlaid on the layout of the map of the retail store by the navigation services control circuit 116 and/or the in-store navigation interface 104. In one implementation, when the in-store navigation interface 104 determines the location of the target retail product, at step 1012, the in-store navigation interface 104 may send the determined location to the navigation services control circuit 116. In response, the navigation services control circuit 116 may determine directions to the determined location and/or overlay the directions onto the layout of the map of the retail store, and subsequently send the directions with the overlaid layout of the retail store to the in-store navigation interface 104 in order for the in-store navigation interface 104 to display at a time each direction to the user relative to the user's and/or the portable electronic device 102's location in the retail store. In another implementation, when the in-store navigation interface 104 determines the location of the target retail product, the in-store navigation interface 104 may determine directions to the determined location and/or overlay the directions onto the layout of the map of the retail store. By one approach, the in-store navigation interface 104 may display directions to the user relative to the user's and/or the portable electronic device 102's location in the retail store, at step 1014. In some embodiments, the in-store navigation interface 104 may determine the directions based in part on sensor data provided by one or more sensors 134 of the portable electronic device 102. By one approach, the one or more sensors 134 may comprise accelerometer, gyroscope useful to navigation, and/or other types of sensors that may provide data useful for determining directions to the target retail product provided to the user. In some configuration, the portable electronic device 102 may comprise a smartphone, an iPad, smartwatch, a laptop, and/or the like. In some configuration, the portable electronic device 102 may comprise a kiosk, a desktop, and/or the like.

In some embodiments, a set of wireless network-based techniques may offer localization and navigation service in a retail store. By one approach, the location of an item (e.g., product item) may be collected base on a distance drawn from a received signal strength indicator (RSSI) between an Electronic Shelf Label (e.g., shelf ESLs 128, product ESLs 130) and BLUETOOTH access point (AP). Alternatively or in addition to, the position of a customer and/or a user may be identified from the measurement of the RSSI between a mobile device and the AP. By one approach, an In-Club map may be pre-constructed based on the locations of the items. Alternatively or in addition to, an optimal route from the location of the customer to the target item may be offered according to different business scenarios. For example, in an initial assessment, the accuracy of the localization systems and the performance of the navigation system in a mini store environment may be validated. In one scenario, the new In-Club navigation system (e.g., the in-store navigation interface 104 and/or the navigation services control circuit 116) may offer a more convenient and easier shopping experience.

For example, a retail store is generally the most widely visited places for general shopping needs fulfillment. This type of business may sell consumer goods to customers through multiple channels of distribution in the stores to earn a profit. As such, a shopping environment of the retail store may have a substantial effect on the retail store's profitability. Generally, a pleasant and convenient store environment could provide a positive emotional state of the customers and may further bring a positive contribution on the store's profitability. Embodiments described herein provides illustrative non-limiting examples that provide creating a pleasant, entertaining experience for the consumer who may be interested in not only just the product, but also the store atmosphere. The embodiments described herein describe improvements on the shopping environment. For example, improvements and/or benefits of the embodiments described herein contributes to the design and/or implementation of a more convenient shopping environment, such as providing customized in-store navigation to a user inside a retail store. By one approach, the design and/or implementation may be an improvement to a shopping experience in a conventional retail store. Alternatively or in addition to, the design and/or implementation may be an improvement integrated into a design and/or implementation of a new retail store.

In some embodiments, a series of wireless network-based techniques may offer localization and path planning service in a retail store environment. For example, the location of items (e.g., the retail products 204) shown in FIG. 2 may be obtained from received signal strength indicator (RSSI) between an Electronic Shelf Label (ESL) and Bluetooth access point (AP). By one approach, the location of the customer may be obtained using the Bluetooth based localization techniques. Alternatively or in addition to, a map of all the items in the entire store shown in FIG. 4 may be constructed and made available for the customers to download on their mobile app. In some configurations, an optimal path may be offered by a recommendation engine (e.g., the portable electronic device 102, the in-store navigation interface 104, the ESL services control circuit 122, and/or the core services control circuit 120) based on the location of the customer, the locations of all the target items as well as some extra information such as time, user name, historical data, etc. As such, the In-Club navigation system may be customized to the customer and/or may offer a more efficient and friendly shopping experience.

In some implementations, the In-Club localization systems may be divided into two parts: item localization (e.g. see FIGS. 1-2), customer localization (e.g., see FIGS. 1-3 and 13). In some configurations, the In-Club localization systems may be based on the BLUETOOTH based localization technique generally known in the industry. By one approach, the systems may include components shown in FIGS. 2 and 13. For example, the systems may include a multi-antenna Bluetooth access point (AP) 124 configured to estimate location, variable attenuators 1302 (which may support multi-antenna Bluetooth access point (AP)), a location sever (e.g., the navigation services control circuit 116), and a mobile device with Bluetooth support (e.g., the portable electronic device 102). By one approach, when a Bluetooth empowered device enters the environment, a connection between the device and the AP's antenna may be established, and then the signal strength may be recorded for each value of the attenuators. In response, the location information may then be evaluated using triangulation or a RADAR like reference technique/algorithm.

Figure 2:
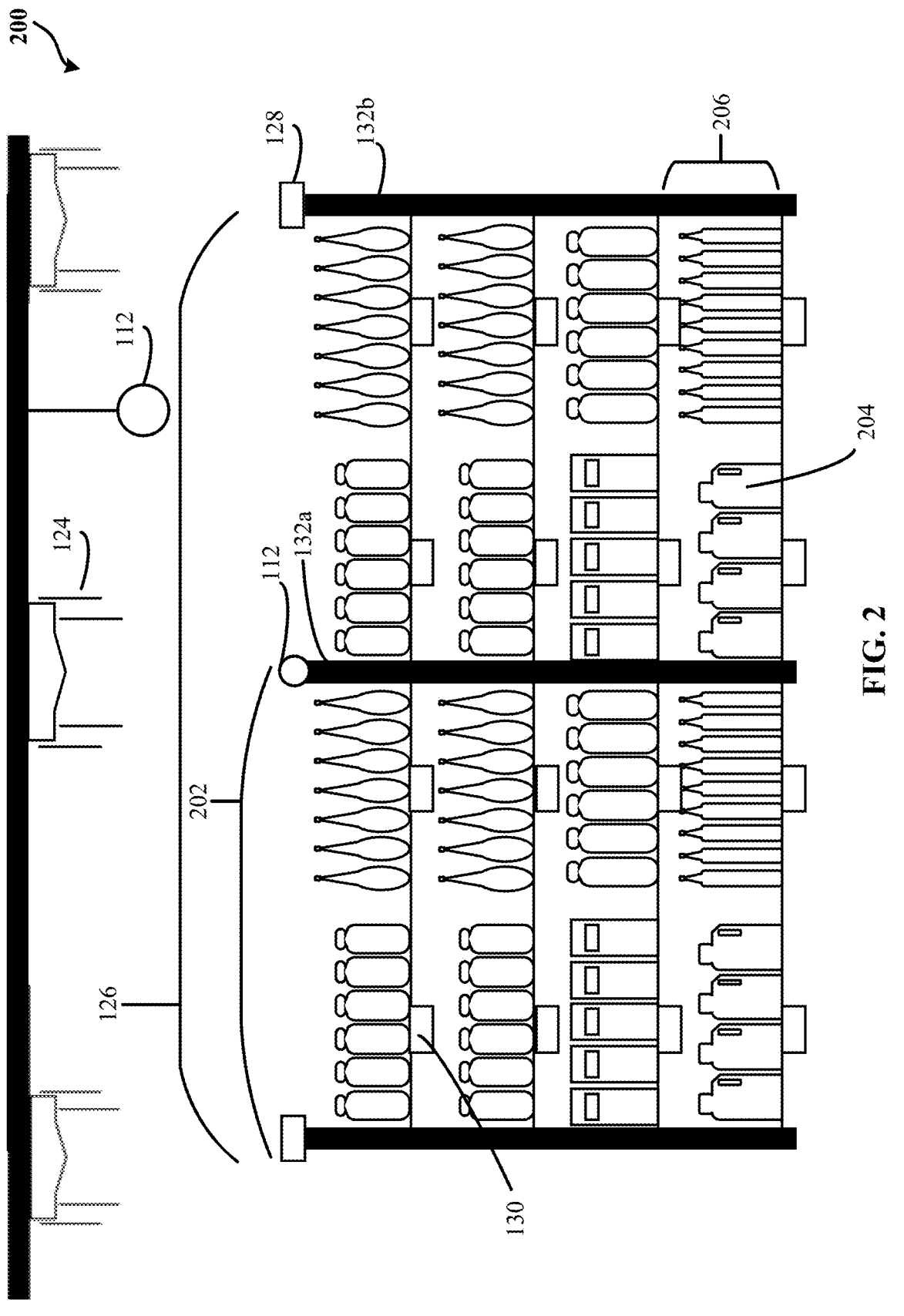
FIG. 2 is a schematic illustration of shelving units of a system for providing customized in-store navigation in accordance with some embodiments.

For example, a technique based on Bluetooth positioning to determine the location of an item and/or to improve the accuracy and reusability of the item localization system. For example, the technique may determine the location of an ESL by sensing Bluetooth signal strength with a reference model-based approach. As shown in FIG. 2, series of multi-antenna Bluetooth access points (AP) may have been pre-installed and the location may have been defined. The AP may establish a connection with the ESL using an antenna, and the signal strengths may be recorded for each value of the attenuators. The AP may be able to switch antenna while maintain the connections with the ESL to reduce the connection establish time. The received signal strength may then be mapped from RSSI using some advanced commercially known techniques. Further, the location of an item may be referenced from the location of an ESL which may calculated based on received signal strength using triangulation or a RADAR like techniques/algorithm. In one scenario, all the ESLs may be designed to work in a low power consumption condition and may be easily adjusted for item relocation. As such, the use of the ESL may provide a solution for a low cost, accurate and/or convenient item localization solution.

Figure 4:
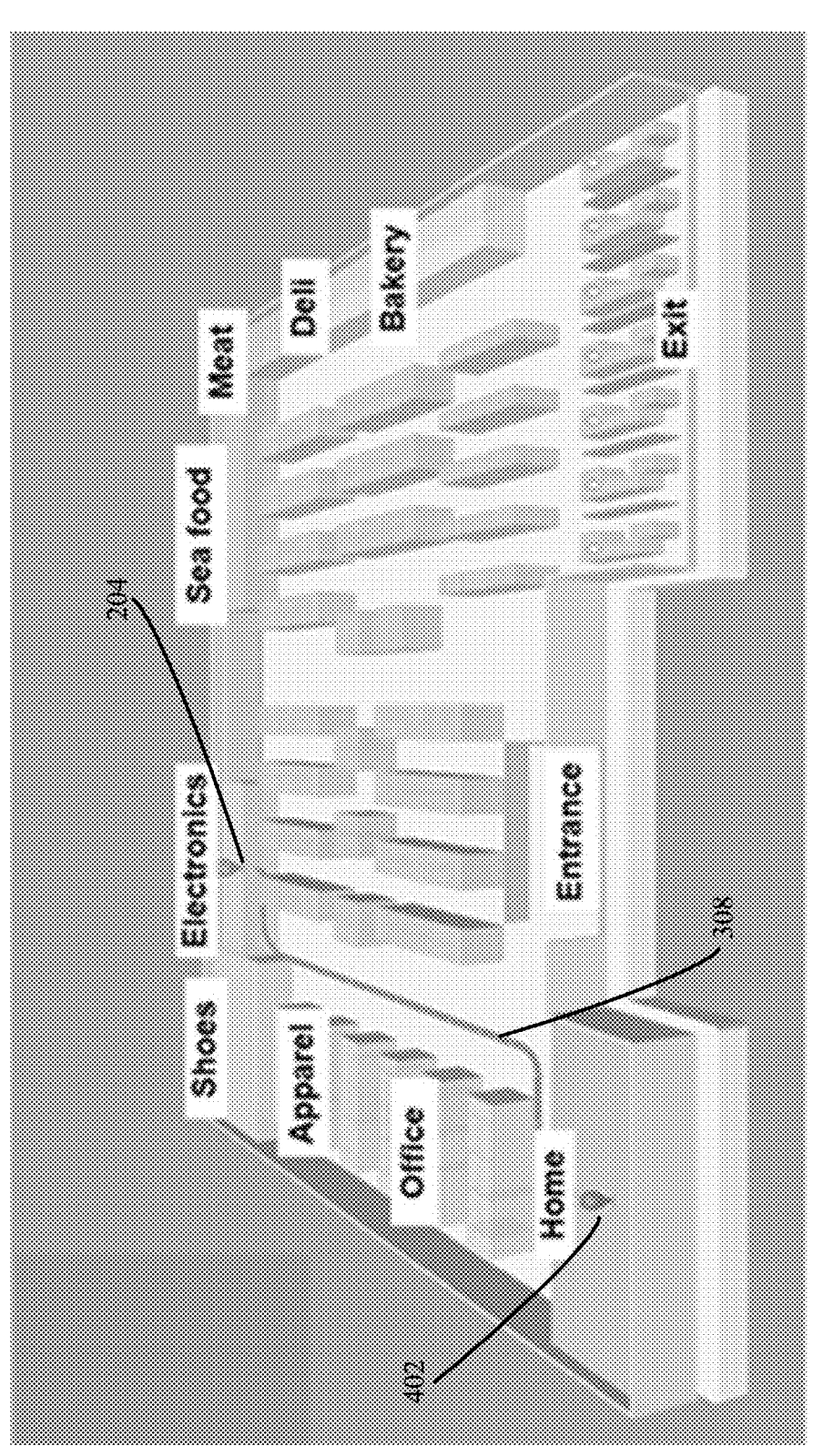
FIG. 4 is a schematic illustration of an exemplary map/directions displayed on a portable electronic device of a system for providing customized in-store navigation in accordance with some embodiments.

In one configuration, the In-Club localization system may find the location of a moving customer continuously and/or accurately based at least in part on usage of BLUETOOTH signal strength of a widely deployable location sensing system. By one approach, FIG. 13 may show some of the components and/or elements used in the customer localization system. For example, a multi-antenna Bluetooth access point (AP) based location estimation technique may be used. In one configuration, the AP may estimate the location of a device empowered by BLUETOOTH. In one scenario, each antenna may be connected to an AP through an attenuator which may be controlled by a location data server (e.g., the navigation services control circuit 116). The AP may establish a connection with a BLUETOOTH device automatically when the device enters the environment. By one approach, a variable attenuator multi-antenna Bluetooth AP may preserve the connection between AP and mobile devices. Alternatively or in addition to, the signal strength may be recorded for each value of the attenuator. By one approach, the location estimation may be based on a reference model-based approach that may be generally known in the industry. In some embodiment, a map for the whole store may be pre-constructed and made available to the customers to download. FIG. 4 shows a full pre-defined store map may be generated. By one approach, the map may be updated when a shelf is moved to a different location in the retail store. For example, the item location and the store map may be pre-collected and/or modified. As such, the customer localization system may offer a real time location information through the In-Club navigation service.

Figure 5:
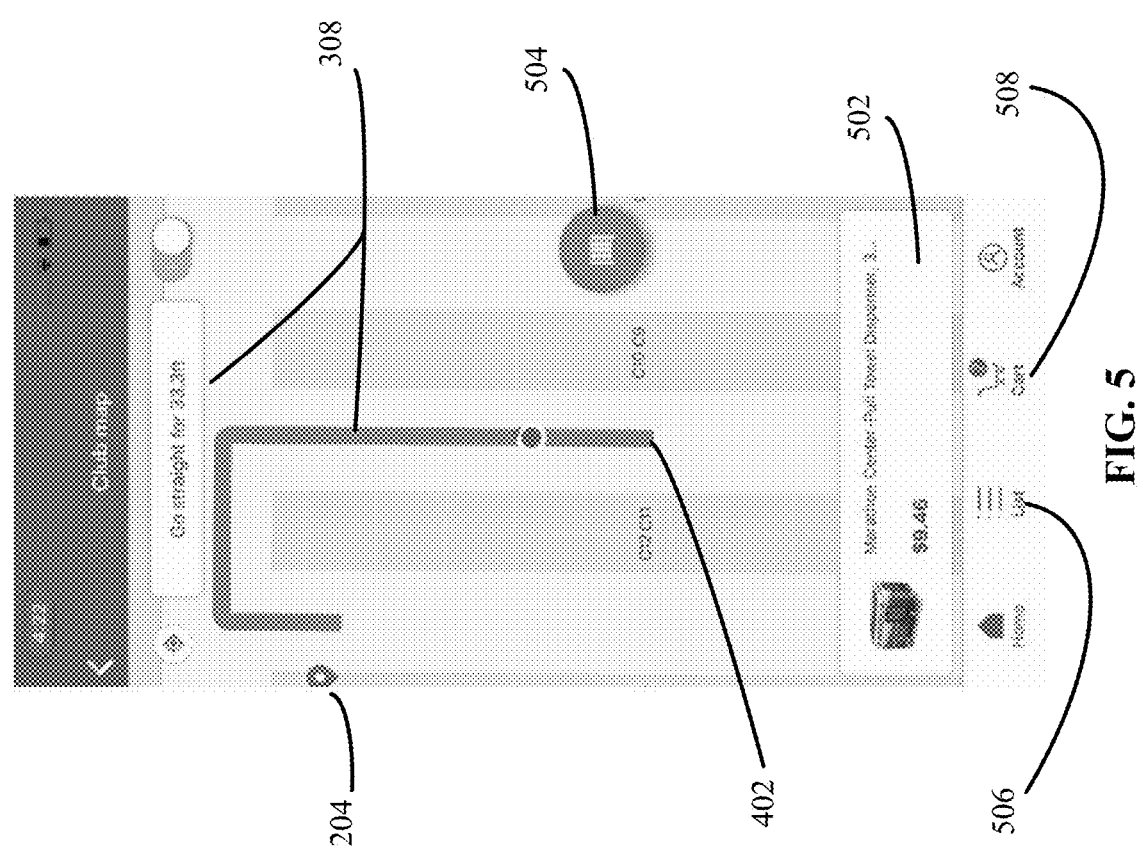
FIG. 5 is a schematic illustration of an exemplary map/directions displayed on a portable electronic device of a system for providing customized in-store navigation in accordance with some embodiments.
Figure 12:
FIG. 12 is a schematic illustration of an exemplary map/directions displayed on a portable electronic device of a system for providing customized in-store navigation in accordance with some embodiments.
Figure 13:
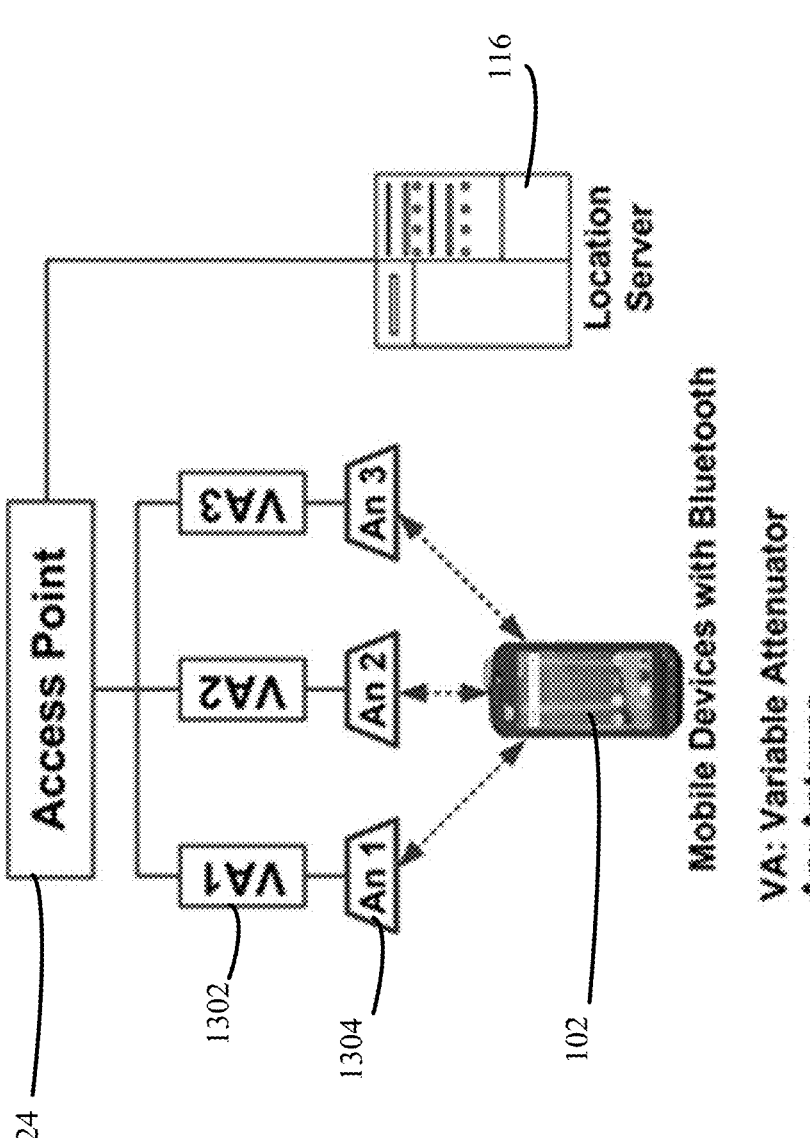
FIG. 13 is an exemplary block diagram of a system providing customized in-store navigation in accordance with some embodiments.

In one configuration, the In-Club navigation system may improve the shopping experience in a retail store. By one approach, a set of path planning techniques may offer a more efficient and/or convenient navigation service in a retailing store. As such, the embodiments described herein minimizes the in store travel time of a customer. In some embodiments, the directions displayed to the user may be a shortest path searching in a rectangular graph with blockage as shown in FIG. 12. In other embodiments, the path may be determined based on the shortest travel time. In other embodiments, the path may be based at least in part on the directing the customer past other items that may be of potential purchasing interest of the customer. For example, the path may be slightly longer, but it directs the customer past other products that the customer has purchased in the past or based on information, might potentially be purchased by the customer if directed past them. In FIG. 5, the store map may be represented using the big rectangle which is divided into several small squares. Each small square may refer to a potential movement from its neighbors. The shadow area denotes to blockages such as other goods or pre-built infrastructures in the store which the customer cannot walk through. Additionally, the customer may follow the directions 308 to the target item 204 from the starting point 402. By one approach, the path planning process described herein may be based on one or more key assumptions, for example, a customer can only move vertically or horizontally (4 directions in total) on the map. This assumption may be valid since the spatial resolution of the customer localization systems may be in sub-meter regime. As such, by taking all the above modeling and assumptions approach together, the shortest path planning could be treated as a simple breadth first search problem which can be solved by utilizing a queue. The directions 308 in FIG. 5 shows one of the optimal paths from the customer A 402 to the target item B 204 obtained through a simple breadth first search denote as P.

Finding optimal paths for multiple items may be based on one or more approaches. For example, for small amount/number of items, exhaustive search algorithms may be used to find optimal paths. In another example, for large amount/number of items, heuristic algorithms may be used to find sub-optimal solutions. These techniques/approaches may offer an ideal path to a customer when we have extra information such as multiple shopping items, historical shopping record, time and/or date of the shopping event etc. The embodiments described herein may offer an In-Club recommendation system that may remind the customer of any potential missing items on their shopping list; the most money saving items the customer does not realized but might be needed in the near future etc. In some exemplary embodiments, the optimum path P may then be selected by maximizing $$\text{Score}(p) = \alpha \cdot D(p) + \beta \cdot I(p) + \gamma \cdot H(c)$$

where the D(p) denotes the travel distance of a particular path, the I(p) denotes the score of the potential shopping items along the path, the H(c) denotes the historical shopping data of a certain customer. The parameters of $\alpha$, $\beta$, $\gamma$ are determined using the historical training data. By doing this, a real time, customer specific In-Club recommendation system is offered that can substantially and/or significantly enhance the customers shopping experience. For an initial evaluation, the item localization system, customer localization system as well as the pre-constructed store map was setup for a mini store, a real-world shopping experience within the mini-store. The accuracy of the localization systems for item and customer were evaluated. This process was repeated for a range of values of item location and the customer location. The effectiveness of the In-Club navigation system is then evaluated by comparing two groups of items searching time with and without the navigation systems. The result of the initial evaluation, the In-Club localization systems offers a good location estimation for both items and customers. As such, the In-Club navigation system can significantly reduce the item searching time for the customer. Thus, the retailing store is generally used for regular shopping purpose. However, searching for a particular item in a big retailing store could sometimes become a challenging task. In some embodiments, a set of techniques based on Bluetooth may be implemented to improve the convenience in a retailing store environment. As a first step, one or more techniques described herein were evaluated at a mini retail store that has a full functionality of a regular retailing store. The results showed that the techniques as described in the embodiments herein afforded much greater convenience than the conventional and/or traditional retailing store that is not implementing these embodiments. Thus, the embodiments described herein may render shopping in a retailing store to be more convenient by, for example, only altering a small portion of the hardware and software in a retailing store while maintaining most of its original component. Further, the added capability of providing In-Club navigation may allow the conventional retailing store to also offer In-Club recommendation service.

Figure 6:
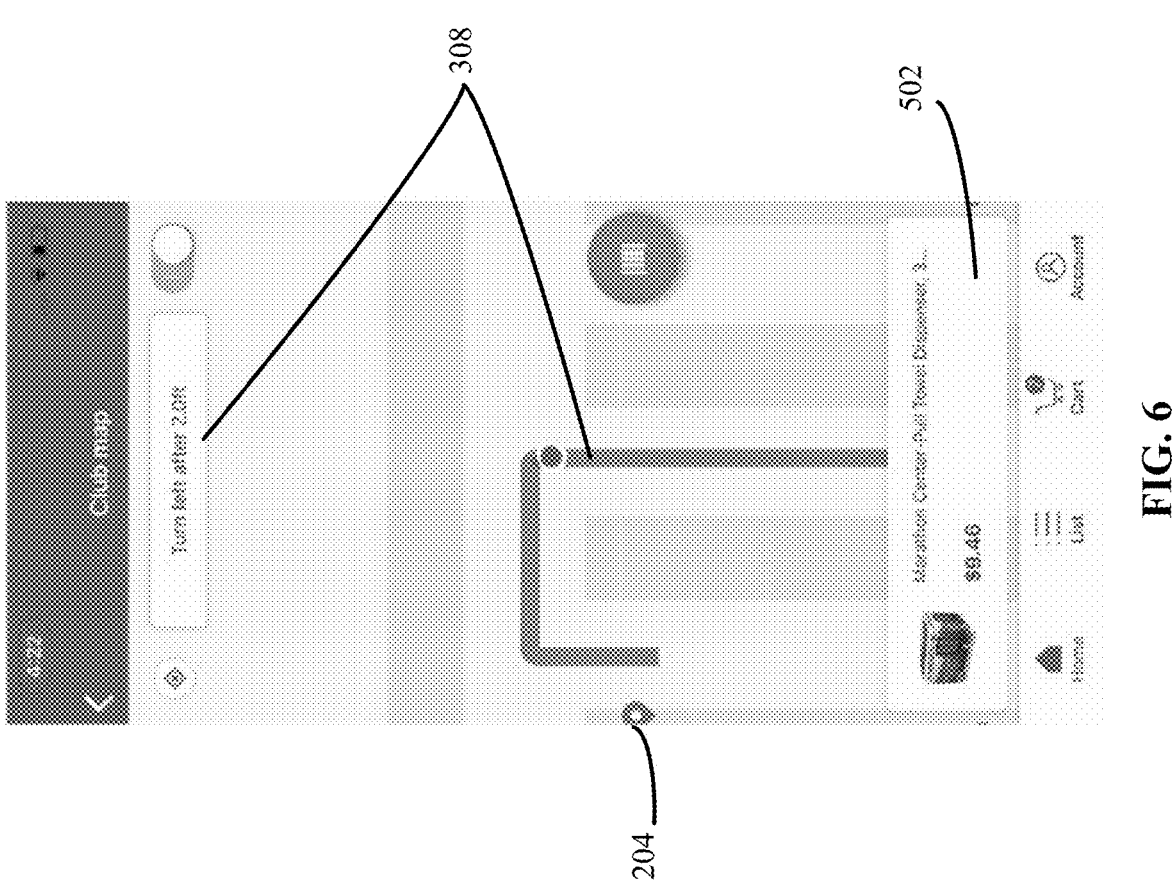
FIG. 6 is a schematic illustration of an exemplary map/directions displayed on a portable electronic device of a system for providing customized in-store navigation in accordance with some embodiments.
Figure 7:
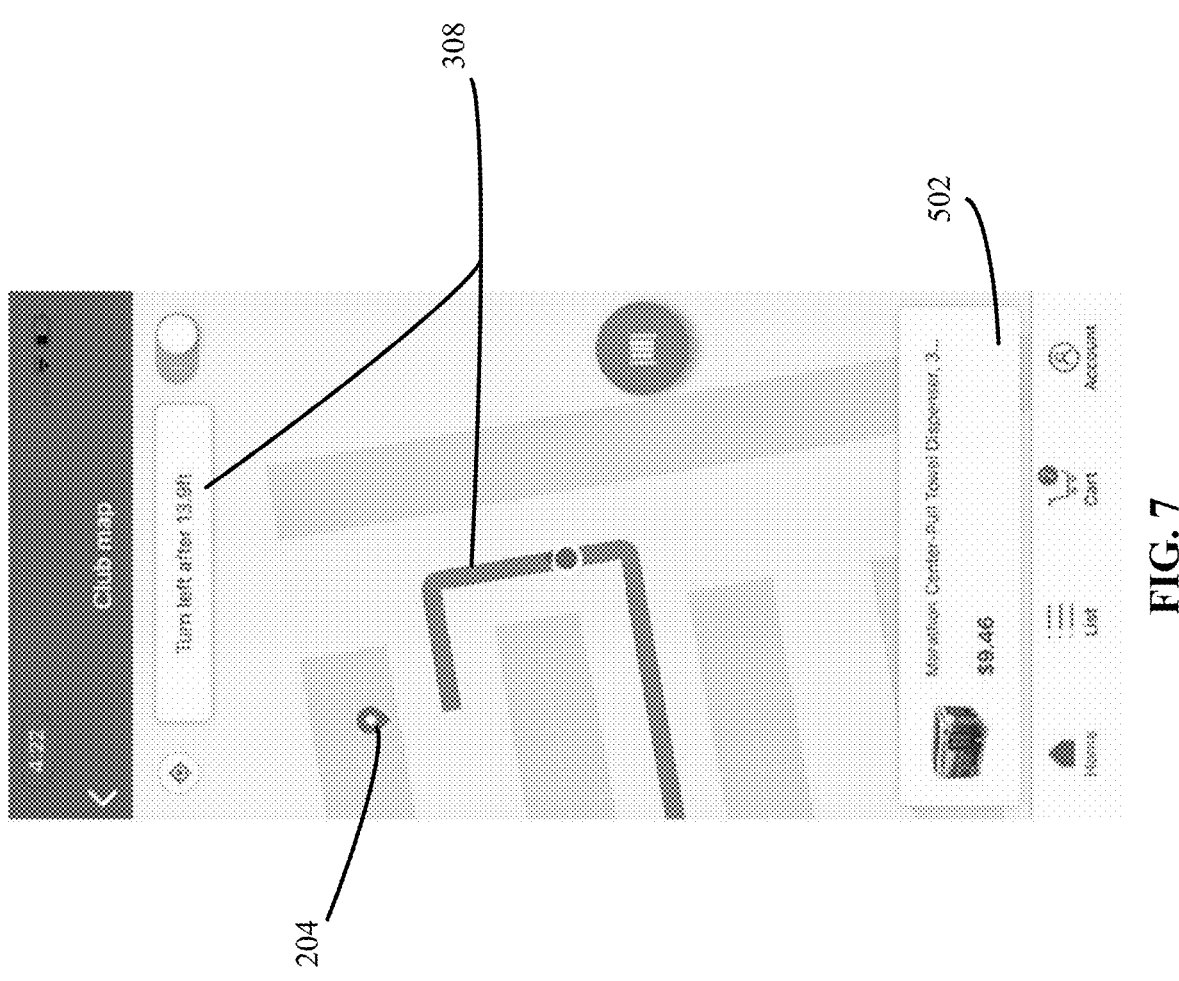
FIG. 7 is a schematic illustration of an exemplary map/directions displayed on a portable electronic device of a system for providing customized in-store navigation in accordance with some embodiments.
Figure 8:
FIG. 8 is a schematic illustration of an exemplary map/directions displayed on a portable electronic device of a system for providing customized in-store navigation in accordance with some embodiments.
Figure 9:
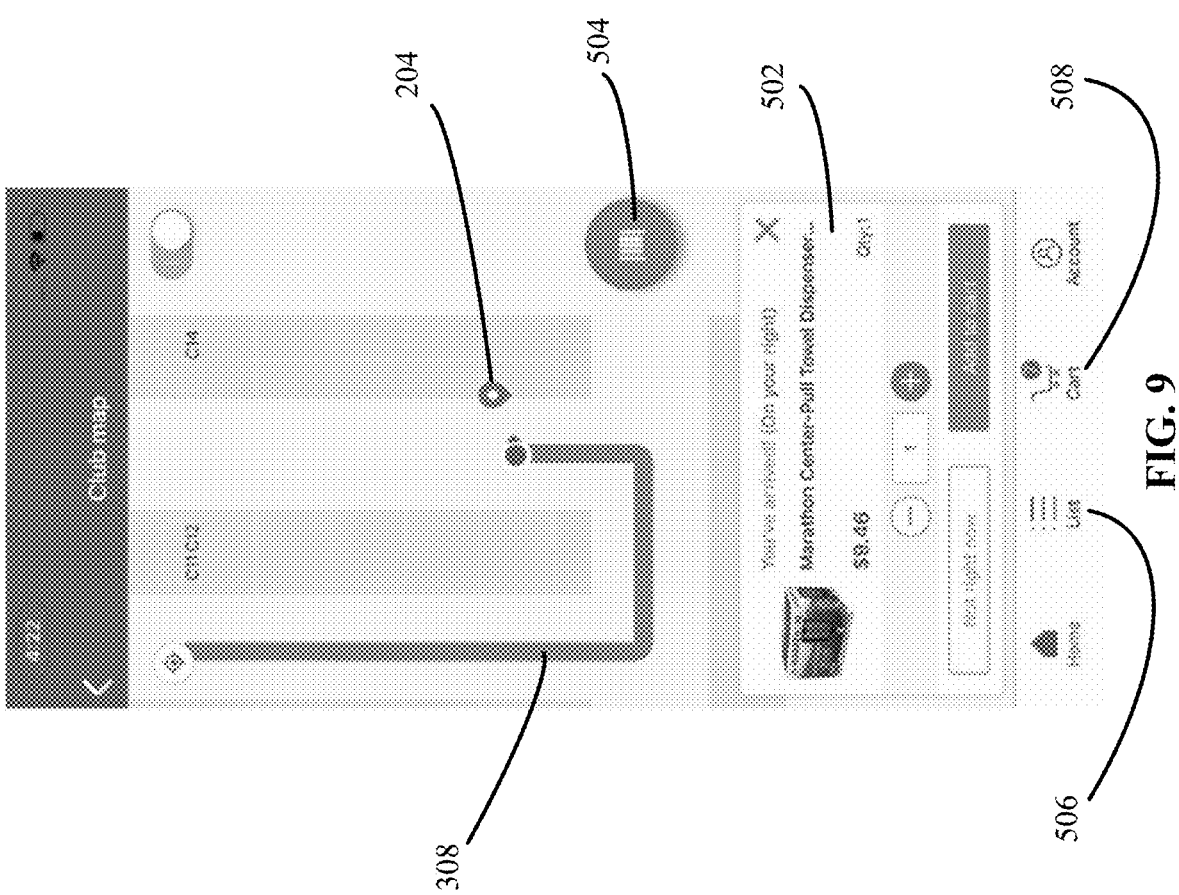
FIG. 9 is a schematic illustration of an exemplary map/directions displayed on a portable electronic device of a system for providing customized in-store navigation in accordance with some embodiments.

To illustrate, FIGS. 4-9 are schematic illustrations of an exemplary map/directions displayed on a portable electronic device of a system for providing customized in-store navigation in accordance with some embodiments. For example, FIG. 4 is an illustrative non-limiting example of the directions to a target location as displayed by the in-store navigation interface 104 on the display device 110. In FIG. 4, a user's starting location 402 and the determined location of a target retail product 204 are identified on a layout of a map 400 of a retail store. By one approach, the map 400 shows the directions 308 from the user's starting location 402 to the location of the target retail product 204. In another example, FIGS. 5-9 is an illustrative non-limiting example of a turn by turn direction 308 to a target location as displayed by the in-store navigation interface 104 on the display device 110. In FIG. 5, a map 500 of the retail store shows that a user has started walking towards the location of the target retail product 204 from the user's starting location 402. In some implementation, the target retail product 204 may be pictorially identified 502. In FIG. 6, a map 600 of the retail store shows that the user is directed to turn left after 2.0 ft. In another approach, the units of the distance may comprise Metric units and English units. In FIG. 7, a map 700 of the retail store shows that the user is directed to make another left turn after 13.9 ft. In FIG. 8, a map 800 of the retail store shows that the user is about to reach the target retail product 204 after 9.6 ft. In FIG. 9, a map 900 of the retail store shows that the user has reached the location of the target retail product 204. The pictorial identification 502 of the target retail product 204 may also indicate that the user has arrived at the location of the target retail product 204.

In some implementation, the maps 500, 600, 700, 800, and/or 900 may include a scan icon 504, a listing icon 506, and/or a shopping cart icon 508. In one example, the scan icon 504 may be operated on by the user when the user sees a product item that is desirable to be included in the electronic shopping cart associated with the shopping cart icon 508 (e.g., product items in the electronic shopping cart may include product items that the user is ready to purchase prior to leaving the retail store) and/or a listing of product items associated with the listing icon 506 that the user may purchase in the future. In another example, there are various functionalities that may be associated with the electronic shopping cart associated with the shopping cart icon 508 and/or the listing of product items associated with the listing icon 506 that are usable in providing an efficient and/or pleasant shopping experience by the user at a retail store. In some embodiments, the maps 500, 600, 700, 800, and/or 900 may include one or more pop-ups (e.g., shown in FIGS.

Figure 14:
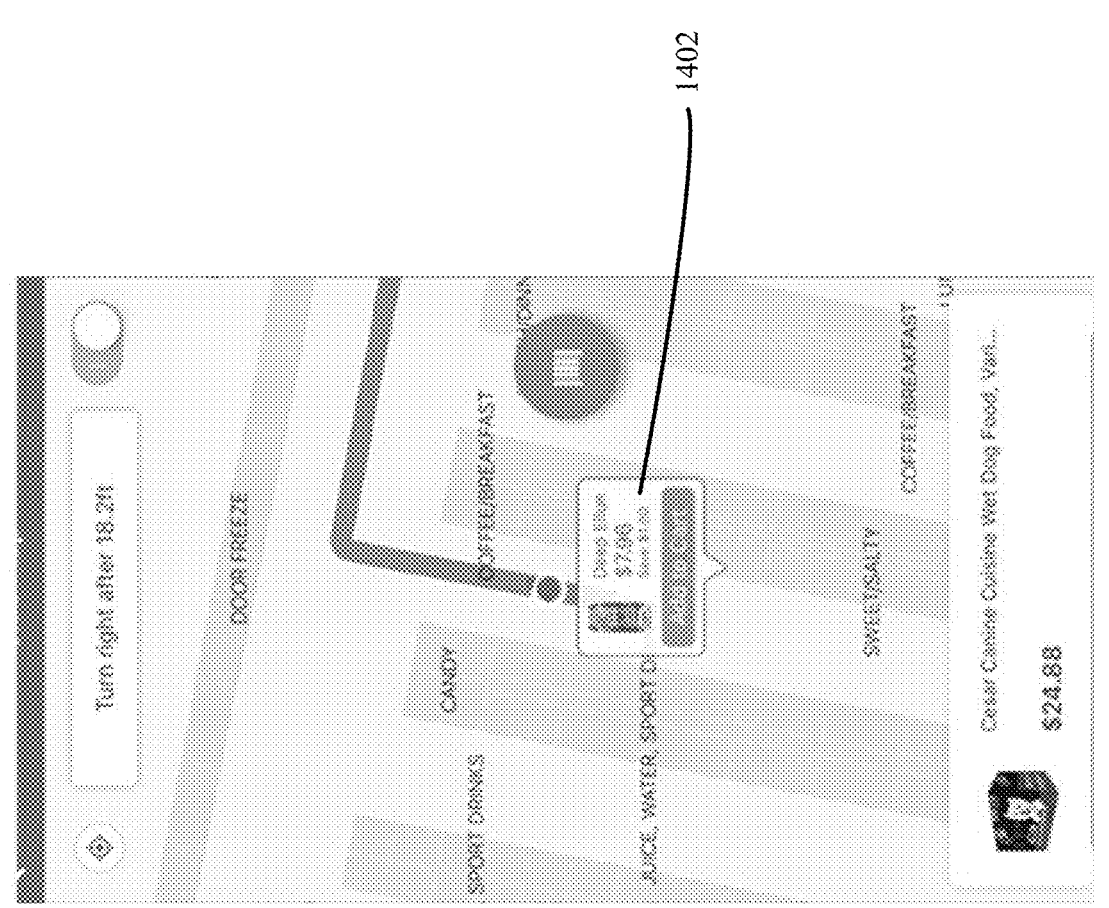
FIG. 14 is a schematic illustration of an exemplary map/directions displayed on a portable electronic device of a system for providing customized in-store navigation in accordance with some embodiments.
Figure 15:
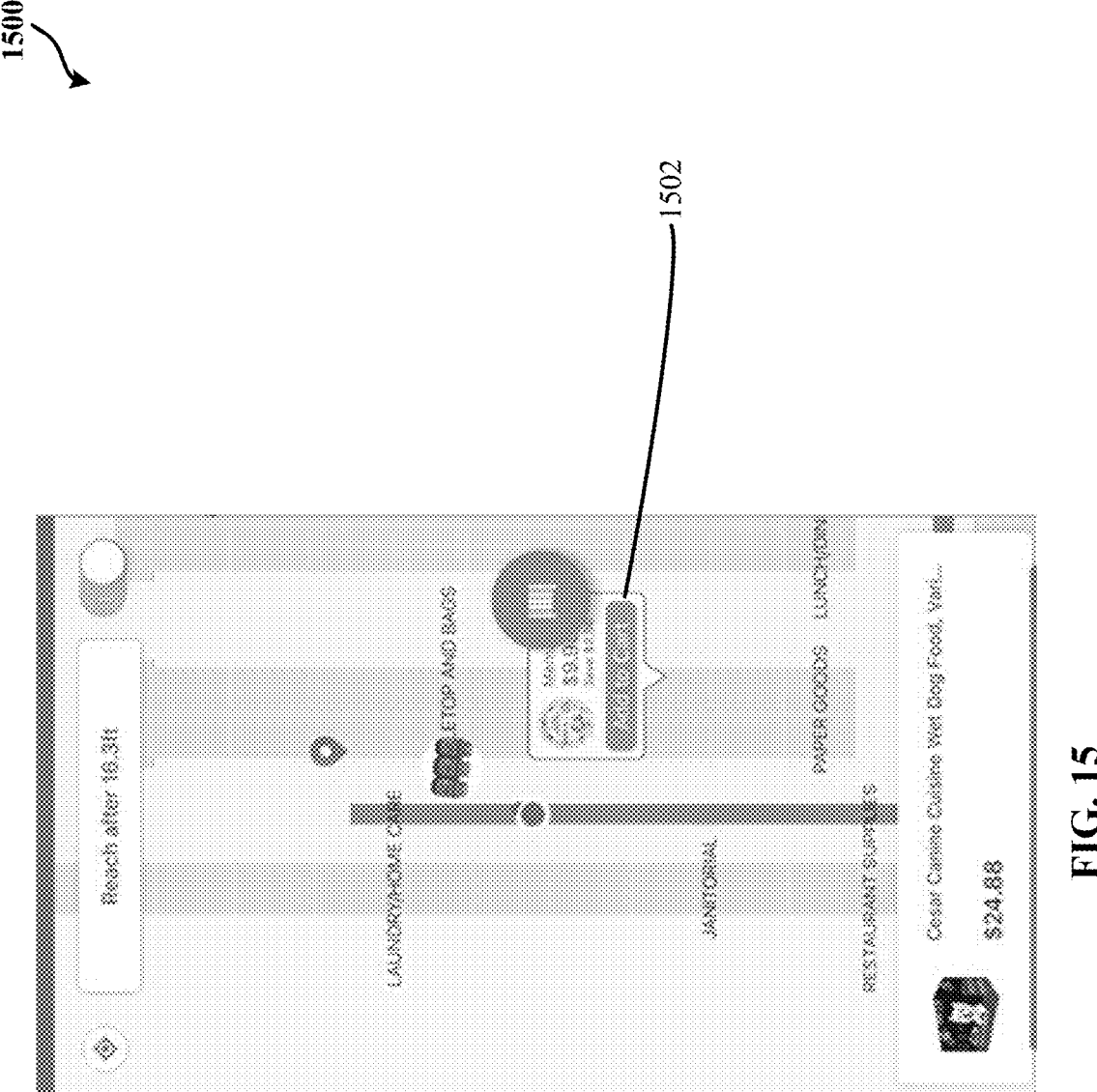
FIG. 15 is a schematic illustration of an exemplary map/directions displayed on a portable electronic device of a system for providing customized in-store navigation in accordance with some embodiments.

14-15) that provides one or more descriptions (including pictorial depictions) associated with one or more retail products that the user may passed by (e.g., 1402 of FIG. 14) and/or within a proximate distance to the user as the user follows the directions provided on the display device 110 (e.g., 1502 of FIG. 15). In one example, the one or more pop-ups may be associated with products that the user frequently buys, may want to buy based on a purchase history, buying patterns, and/or the like, and/or one or more promotional products. In some implementation, the user inputs 136 may be based at least in part on smart shopping list created and associated with the user based at least in part on the user's buying history, patterns, tendencies, and/or the like. In some embodiments, such pop-ups may be overlaid with the navigation and may include interactive elements that may be viewed and selected by the user. Interactive elements can include images, photos, videos, data and/or links thereto, that can relate to the items, promotions, product information, store events, etc., and can represent an augmentation to the navigational directional display presented to the user.

Figure 11:
FIG. 11 illustrates an exemplary system for use in implementing systems, apparatuses, devices, methods, techniques, and the like in providing customized in-store navigation in accordance with several embodiments.
Figure 11:
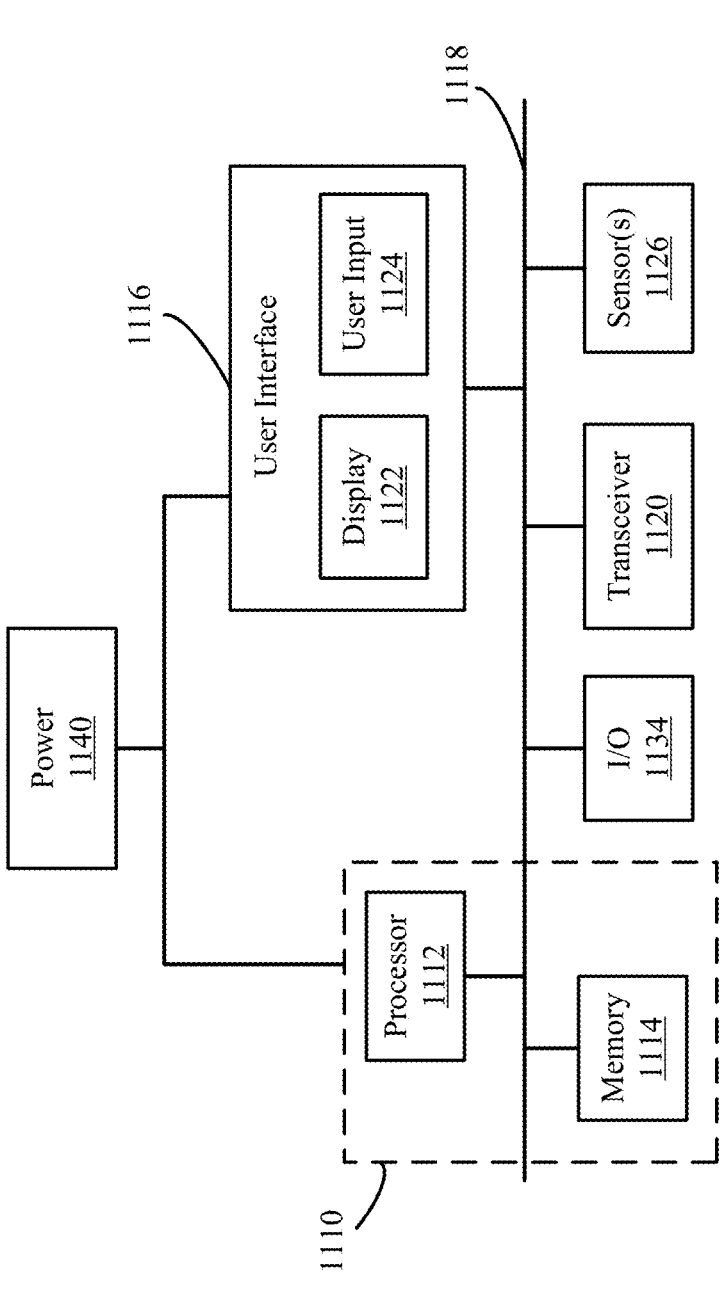

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of the system 100 of FIG. 1, the method 1000 of FIG. 10, and/or other above or below mentioned systems or devices, or parts of such circuits, circuitry, functionality, systems, apparatuses, processes, or devices. For example, the system 1100 may be used to implement some or all of the system for providing customized in-store navigation to a user inside a retail store, the portable electronic device 102, the in-store navigation interface 104, the transceiver 106, the first control circuit 108, the display device 110, the plurality of wireless beacons 112, the plurality of databases 114, the navigation services control circuit 116, the one or more databases 118, the shelf electronic shelf labels (shelf ESLs) 128, the product electronic shelf labels (product ESLs) 130, the wireless access points (WAPs) 124, the ESL services control circuit 122, the core services control circuit 120, and/or other such components, circuitry, functionality and/or devices. However, the use of the system 1100 or any portion thereof is certainly not required.

By way of example, the system 1100 may comprise a processor module (or a control circuit) 1112, memory 1114, and one or more communication links, paths, buses or the like 1118. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like. For example, the system 1100 may implement the system for providing customized in-store navigation to a user inside a retail store with the first control circuit 108, the portable electronic device 102, the navigation services control circuit 116, the ESL services control circuit 122, and/or the core services control circuit 120 being the control circuit 1112.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) interface 1134 that allow one or more devices to couple with the system 1100. The I/O interface can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1126 to provide information to the system and/or sensor information that is communicated to another component, such as the portable electronic device 102, the in-store navigation interface 104, the first control circuit 108, the plurality of databases 114, the navigation services control circuit 116, the one or more databases 118, the shelf electronic shelf labels (shelf ESLs) 128, the product electronic shelf labels (product ESLs) 130, the wireless access points (WAPs) 124, the ESL services control circuit 122, the core services control circuit 120, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor readable and/or computer readable media accessed by at least the control circuit 1112, and can include volatile and/or nonvolatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing customized in-store navigation to a user inside a retail store comprising:

a plurality of product electronic shelf labels (product ESLs) each associated with a set of product items belonging to a particular retail product of a plurality of retail products;

a plurality of shelf electronic shelf labels (shelf ESLs) each configured to determine a signal strength for each product ESL wirelessly coupled with the shelf ESL;

a plurality of Bluetooth wireless access points (WAPs) disposed throughout the retail store and used to estimate locations for the plurality of shelf ESLs, the plurality of product ESLs, and customer portable electronic devices disposed at the retail store using Bluetooth-based localization techniques;

an ESL services control circuit configured to, for each product ESL of the plurality of product ESLs, determine location information for the product ESL using (i) the signal strength between the product ESL and the shelf ESL wirelessly coupled with the product ESL, and (ii) signal strengths between the shelf ESL wirelessly coupled with the product ESL and the plurality of Bluetooth WAPs; and a navigation services control circuit configured to transmit the location information associated with each of the plurality of product ESLs at the retail store to an in-store navigation interface operable on a portable electronic device, wherein the in-store navigation interface is configured to:

identify a target retail product of the plurality of retail products from a user input via the portable electronic device;

based on the portable electronic device coupling or communicating with one of the plurality of Bluetooth WAPs, receive the location information associated with the plurality of product ESLs from the navigation services control circuit via a transceiver of the portable electronic device;

determine a location of the target retail product identified from the user input based on a corresponding product ESL of the plurality of product ESLs associated with the location information;

determine a location of the portable electronic device based signal strengths between the Bluetooth WAPs and the portable electronic device; and display directions from the location of the portable electronic device to the location of the target retail product and a pictorial identification of the target retail product on a display device of the portable electronic device.

2. The system of claim 1, wherein each of the shelf ESLs is mounted to each one of at least two support members coupled to each end of a shelving unit.

3. The system of claim 1, wherein each of the shelf ESLs is associated with a particular shelving unit of a plurality of shelving units.

4. The system of claim 1, further comprising a plurality of wireless beacons located proximate to a plurality of shelving units associated with the plurality of shelf ESLs and configured to transmit wireless beacon signals usable in determining a location of the portable electronic device, wherein each wireless beacon signal of the plurality of wireless beacons comprises a beacon identifier.

5. The system of claim 1, wherein the portable electronic device automatically communicatively couples with at least one of the plurality of Bluetooth WAPs in the retail store when the user enters the retail store.

6. The system of claim 1, wherein:

the user input comprises an electronic shopping cart associated with the user, and the in-store navigation interface automatically accesses the electronic shopping cart associated with the user to identify the target retail product.

7. The system of claim 1, wherein the in-store navigation interface is further configured to:

update the displayed directions to the location of the target retail product based on a relative location of the portable electronic device in the retail store; and based on the relative location of the portable electronic device, update the displayed directions to include a pop-up indicator on a map of the displayed directions at a location on the map corresponding to a location of a pop-up product within the retail store, wherein the pop-up product is associated with buying patterns of the user.

8. The system of claim 7, wherein the location of the portable electronic device in the retail store is determined based on a communicative coupling of the portable electronic device with at least one of the plurality of Bluetooth WAPs in the retail store.

9. The system of claim 1, wherein the displayed directions to the location of the target retail product corresponds to an optimal path relative to alternative paths to the location of the target retail product based on all target retail products identified from the user input and the location of the portable electronic device in the retail store.

10. The system of claim 1, wherein:

the ESL services control circuit is further configured to transmit particular pricing information to each of the plurality of product ESLs;

the system further comprises:

a plurality of databases configured to store one or more of a plurality of pricing data, a plurality of product items data, a plurality of product items sales descriptions, and a plurality of promotional data; and a core services control circuit coupled to the ESL services control circuit, the plurality of databases, and the navigation services control circuit, the core services control circuit configured to:

receive the location information of the plurality of product ESLs from the ESL services control circuit; and transmit the location information of the plurality of product ESLs to the navigation services control circuit; and the navigation services control circuit is further configured to:

associate each of the location information of the plurality of product ESLs with one or more floor areas in the retail store; and transmit a map of the retail store with directions to the location of the target retail product to the in-store navigation interface.

11. The system of claim 10, wherein the plurality of Bluetooth WAPs are configured to wirelessly communicate with at least one of the plurality of shelf ESLs, the plurality of product ESLs, and the ESL services control circuit, wherein the plurality of Bluetooth WAPs comprise WIFI-based access points.

12. A method for providing customized in-store navigation to a user inside a retail store comprising:

identifying, by an in-store navigation interface operable on a portable electronic device, a target retail product of a plurality of retail products from a user input via the portable electronic device;

based on the portable electronic device coupling or communicating with one of a plurality of Bluetooth wireless access points (WAPs) of the retail store, receiving, by the in-store navigation interface from a navigation services control circuit, location information associated with each of a plurality of product electronic shelf labels (product ESLs) via a transceiver of the portable electronic device, wherein:

each of the plurality of product ESLs is associated with a set of product items belonging to a particular retail product of the plurality of retail products, for each product ESL of the plurality of product ESLs, the location information associated with the product ESL is determined by an ESL services control circuit using (i) a signal strength between the product ESL and a shelf electronic shelf label (shelf ESL) wirelessly coupled with the product ESL, and (ii) signal strengths between the shelf ESL wirelessly coupled with the product ESL and the plurality of Bluetooth WAPs, and the plurality Bluetooth WAPs are used to estimate locations for the plurality of shelf ESLs, the plurality of product ESLs, and customer portable electronic devices disposed at the retail store using Bluetooth-based localization techniques;

determining, by the in-store navigation interface, a location of the target retail product identified from the user input based on the location information associated with each of the plurality of product ESLs;

determining, by the in-store navigation interface, a location of the portable electronic device based signal strengths between the Bluetooth WAPs and the portable electronic device; and displaying, by the in-store navigation interface, a direction to the location of the target retail product and a pictorial identification of the target retail product to a display device of the portable electronic device.

13. The method of claim 12, wherein each of the shelf ESLs is mounted to each one of at least two support members coupled to each end of a shelving unit.

14. The method of claim 12, wherein each of the shelf ESLs is associated with a particular shelving unit of a plurality of shelving units.

15. The method of claim 12, further comprising transmitting, by a plurality of wireless beacons located proximate to a plurality of shelving units associated with the plurality of shelf ESLs, wireless beacon signals usable in determining a location of the portable electronic device, wherein each wireless beacon signal of the plurality of wireless beacons coupled to the in-store navigation interface comprises a beacon identifier.

16. The method of claim 12, further comprising automatically communicatively coupling the portable electronic device with at least one of the plurality of Bluetooth WAPs in the retail store when the user enters the retail store.

17. The method of claim 12, further comprising automatically accessing, by the in-store navigation interface, an electronic shopping cart associated with the user to identify the target retail product, wherein the user input comprises the electronic shopping cart associated with the user.

18. The method of claim 12, further comprising updating, by the in-store navigation interface, the displayed directions to the location of the target retail product based on a relative location of the portable electronic device in the retail store.

19. The method of claim 18, wherein the location of the portable electronic device in the retail store is determined based on a communicative coupling of the portable electronic device with at least one of the plurality of Bluetooth WAPs in the retail store.

20. The method of claim 12, wherein the displayed directions to the location of the target retail product corresponds to an optimal path relative to alternative paths to the location of the target retail product based on all target retail products identified from the user input and the location of the portable electronic device in the retail store.

* * * * *